US 8,191,483 B2
Jun. 5, 2012

(12) United States Patent
Tabler

(10) Patent No.: US 8,191,483 B2
(45) Date of Patent: Jun. 5, 2012

(54) PILLOW BLOCK BEARING FOR SHAFT DRIVEN CONVEYOR SYSTEM WITH SELF ALIGNING FEATURE

(75) Inventor: Charles Paul Tabler, Cincinnati, OH (US)

(73) Assignee: OCS Intellitrak, Inc., Cincinnati, OH (US)

(*) Notice: Subject to any disclaimer, the term of this patent is extended or adjusted under 35 U.S.C. 154(b) by 590 days.

(21) Appl. No.: 12/233,995

(22) Filed: Sep. 19, 2008

(65) Prior Publication Data

US 2009/0078149 A1  Mar. 26, 2009

Related U.S. Application Data

(60) Provisional application No. 60/974,311, filed on Sep. 21, 2007.

(51) Int. Cl.
*B61B 9/00* (2006.01)

(52) U.S. Cl. ............ 104/166; 198/465.4; 248/343

(58) Field of Classification Search ............ 104/166, 104/167; 198/465.4; 248/323, 343
See application file for complete search history.

(56) References Cited

U.S. PATENT DOCUMENTS

| 316,410 | A | 1/1965 | Hunt | |
| 385,028 | A | 11/1974 | Ohrnell | |
| 4,036,148 | A * | 7/1977 | Jones et al. | 104/166 |
| 4,203,511 | A | 5/1980 | Uhing | |
| 4,363,275 | A * | 12/1982 | Kaji | 104/166 |
| 4,375,194 | A * | 3/1983 | Rohrbach | 104/166 |
| 4,648,325 | A * | 3/1987 | Gutekunst et al. | 104/166 |
| 5,443,012 | A * | 8/1995 | Underbrink et al. | 104/53 |
| 5,785,168 | A | 7/1998 | Beall | |
| 5,806,655 | A | 9/1998 | Tabler | |
| 6,457,418 | B1 * | 10/2002 | Persson | 104/166 |
| 7,178,661 | B2 * | 2/2007 | Tabler | 198/465.3 |
| 7,337,894 | B2 * | 3/2008 | Tabler | 198/465.4 |
| 7,562,763 | B2 * | 7/2009 | Tabler | 198/465.4 |
| 7,686,156 | B2 * | 3/2010 | Tabler | 198/465.4 |
| 7,712,239 | B2 * | 5/2010 | Pitcher et al. | 40/617 |
| 2009/0127412 | A1 * | 5/2009 | Kleege | 248/214 |

* cited by examiner

*Primary Examiner* — S. Joseph Morano
*Assistant Examiner* — Zachary Kuhfuss
(74) *Attorney, Agent, or Firm* — Frost Brown Todd LLC

(57) ABSTRACT

A rotating shaft drive system is configured to propel a load along a conveying path of an overhead conveyor system. A stationary frame extends along the conveying path and supports the rotating shaft drive system. A movable carriage is suspended from the stationary frame and engages with a rotating shaft of the shaft drive system to propel the carriage and the load. The rotating shaft comprises a plurality of shaft segments supported pillow blocks at each end of the rotating shaft segments, and the pillow blocks create a gap between adjacent shaft segments. The movable carriage has at least one canted driven roller configured to engage with adjacent rotating shaft segments and to create a helical loci of tractional engagement that provides sufficient drive force to propel the carriage and the load along the conveying path. The drive system is further configured to provide continuous propulsion as the canted driven roller moves across the gap between adjacent shaft segments.

11 Claims, 4 Drawing Sheets

PILLOW BLOCK BEARING FOR SHAFT DRIVEN CONVEYOR SYSTEM WITH SELF ALIGNING FEATURE

CROSS REFERENCE TO RELATED APPLICATIONS

The present application hereby claims the benefit of the provisional patent application of the same title, Ser. No. 60/974,311 filed on Sep. 21, 2007.

FIELD OF THE PRESENT DRIVE SYSTEM

The present drive system relates to a shaft driven conveyor system and relates, in general, to an overhead conveyor system with a carriage suspended therefrom and a rotating drive shaft having a plurality of inline shaft sections configured to drive the carriage along the overhead conveyor system and across gaps between the inline shaft sections.

BACKGROUND

In a conventional factory or distribution warehouse, it is desirable to move loads along a transporting path that is predominately horizontal, but which may also involve travel uphill, downhill, diversion between subpaths, and the like. These systems provide an overhead conveyor system with rotating drive shafts, a carriage that is supported by the drive shaft or by a fixed support rail, and a carriage that has skewed drive wheels to engage with the rotating drive shaft. The engagement of the skewed wheels with the rotating drive shaft propels the carriage along the rotating drive shaft or along a fixed rail.

The present slip tube system relates to overhead conveyors of the type disclosed in U.S. Pat. No. 5,806,655 issued Sep. 15, 1998 to Tabler, in U.S. Pat. No. 5,785,168 issued Jul. 28, 1998 to Beall, Jr., in U.S. Pat. No. 4,203,511 issued May 20, 1980 to Uhing, in U.S. Pat. No. 3,164,104 issued Jan. 5, 1965 to Hunt, and in U.S. Pat. No. 3,850,280 issued Nov. 26, 1974 to Ohrnell. Shaft driven overhead conveyors have many advantages over the heavier load type conveyors such as the power and free conveyor; such advantages including quietness, cleanliness, less repair, easy diversion of load carrying carriages, buffering, speed variation along the conveying path, and generally greater flexibility in design.

Conventional prior art rotating shaft driven overhead conveyors can be constructed from a plurality of inline rotating drive shafts that move loads along the rotating drive shafts from the interaction of skewed or canted driven wheels attached to the carriage which engages with the rotating drive shaft. The canted driven wheels tractionally engage with the rotating drive shaft in a helical spiral path along an exterior drive surface of the rotating drive shaft to move the load along the overhead conveyor. A gap exists between the consecutive sections of the plurality of inline rotating drive shafts and a pillow block fits into this gap to support the ends of adjacent sections of the plurality of inline rotating drive shafts. With prior art systems, if the gap is too wide, the canted driven wheels decouple from the rotating drive shafts when moving across the gap, resulting in a drop of propulsive force to the carriage. With heavy loads, this loss of propulsive force can result in slowdown or stoppage of the carriage as the driven wheels decouple from the rotating drive shafts.

Consequently, a significant need exists for a drive system that can propel a load across the gaps between a plurality of rotating drive shafts, a bearing block of the drive system that can both support ends of two adjacent drive shafts and reduce the gap therebetween, a bearing block that can align with the conveying path, and a need for a carriage with drive rollers configured to be always in driven contact with at least one of the plurality of rotating drive shafts when passing across the gap between adjacent drive shafts.

BRIEF SUMMARY OF THE DRIVE SYSTEM

The drive system overcomes the above-noted and other deficiencies of the prior art by providing a rotating shaft drive system for propelling at least one load along a conveying path of an overhead conveyor system. The rotating shaft drive system comprises a stationary frame extending along the conveying path and a plurality of rotating drive shafts oriented end-to end along the conveying path. Each of the plurality of drive shafts is rotating about a shaft axis parallel to the conveying path and each having a gap between adjacent drive shafts. A pillow block is located within the gap between adjacent drive shafts to mount the plurality of rotating drive shafts to the stationary frame. A carriage is configured to carry a load along the conveying path with at least one driven wheel mounted on the carriage and free to rotate thereto. The at least one driving wheel canted at an angle to the shaft axis of the drive shaft and configured to tractionally engage with an outer drive surface of at least one of the plurality of rotating drive shafts with sufficient traction so as to form a helical loci of engagement with sufficient force to propel the carriage along the conveying path. Wherein the at least one driven wheel is always in driven contact with at least one of the plurality of rotating drive shafts to continuously provide propulsion to the carriage as said at least one driven wheel transitions from a first one of a plurality of rotating drive shafts to a second one at of the plurality of drive shafts across the gap.

In one aspect of the drive system, a method of propelling at least one load across a gap in a rotating drive shaft of an overhead conveyor system is disclosed. The method comprises a first step of providing a first shaft segment and a second shaft segment coaxially aligned with a gap therebetween, and a carriage with at least one driven wheel in contact with an outer drive surface of at least one of the shaft segments. The at least one driven wheel is canted at an angle to the co-axis of the rotating first shaft segment and the rotating second shaft segment. A second step is provided of rotating the first shaft segment and the second shaft segment simultaneously to tractionally engage the at least one driven wheel with the rotating outer drive surface of at least one of the first shaft segment and the second shaft segment so as to form a constant helical loci of engagement with sufficient force to propel the carriage with the at least one driven wheel. Wherein the at least one driven wheel is always in driven contact with at least one of the rotating first and second shaft segments to continuously provide propulsion to the carriage.

These and other objects and advantages of the present drive system shall be made apparent from the accompanying drawings and the description thereof.

BRIEF DESCRIPTION OF THE FIGURES

The accompanying drawings, which are incorporated in and constitute a part of this specification, illustrate embodiments of the slip tube system, and, together with the general description of the slip tube system given above, and the detailed description of the embodiments given below, serve to explain the principles of the present slip tube system.

DETAILED DESCRIPTION OF THE DRIVE SYSTEM

The following description of certain examples of the drive system should not be used to limit the scope of the present the drive system. Other examples, features, aspects, embodiments, and advantages of the drive system will become apparent to those skilled in the art from the following description, which is by way of illustration, one of the best modes contemplated for carrying out the drive system. As will be realized, the drive system is capable of other different and obvious aspects, all without departing from the drive system. Accordingly, the drawings and descriptions should be regarded as illustrative in nature and not restrictive.

Figure 1:
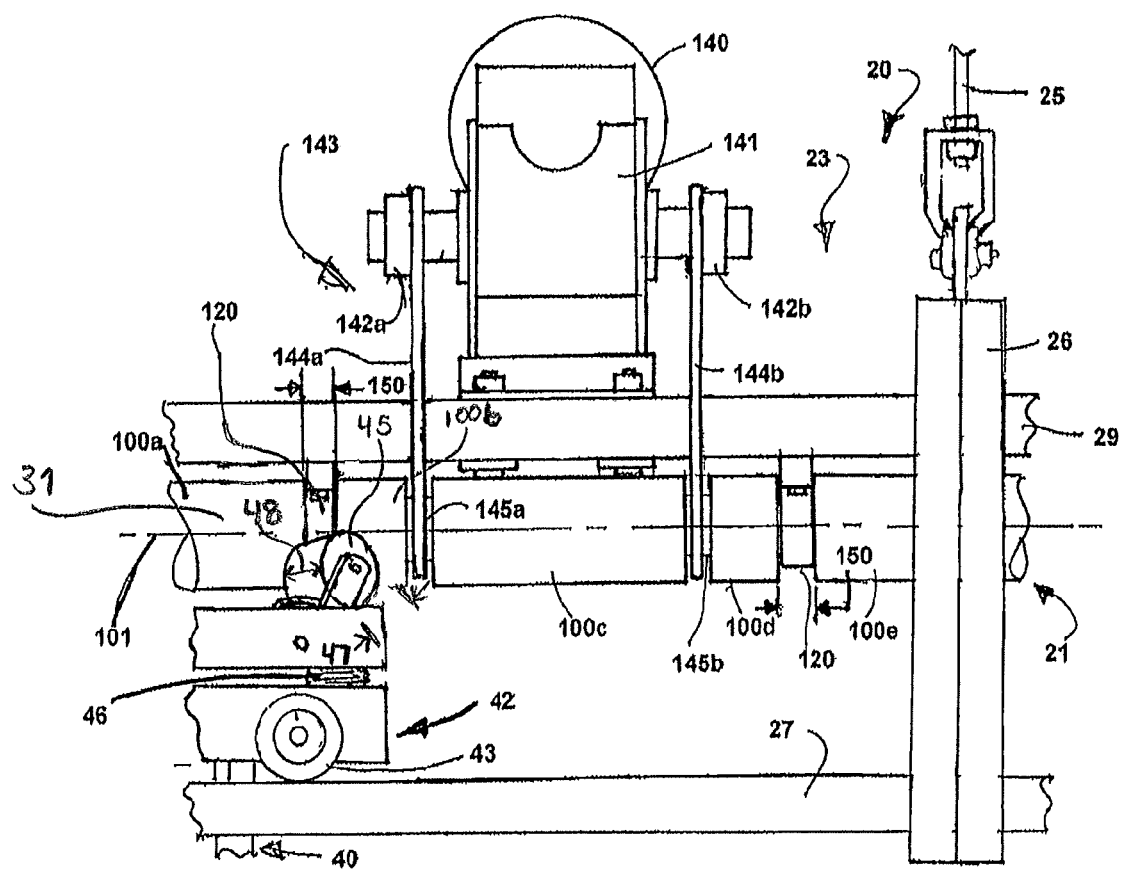
FIG. 1 is an end cross sectional view of an overhead conveyor system having a rotating shaft drive system to propel a trolley along a conveying path with a drive system configured to provide propulsion across gaps between a pair of adjacent segments of the rotating shaft drive system.
Figure 2:
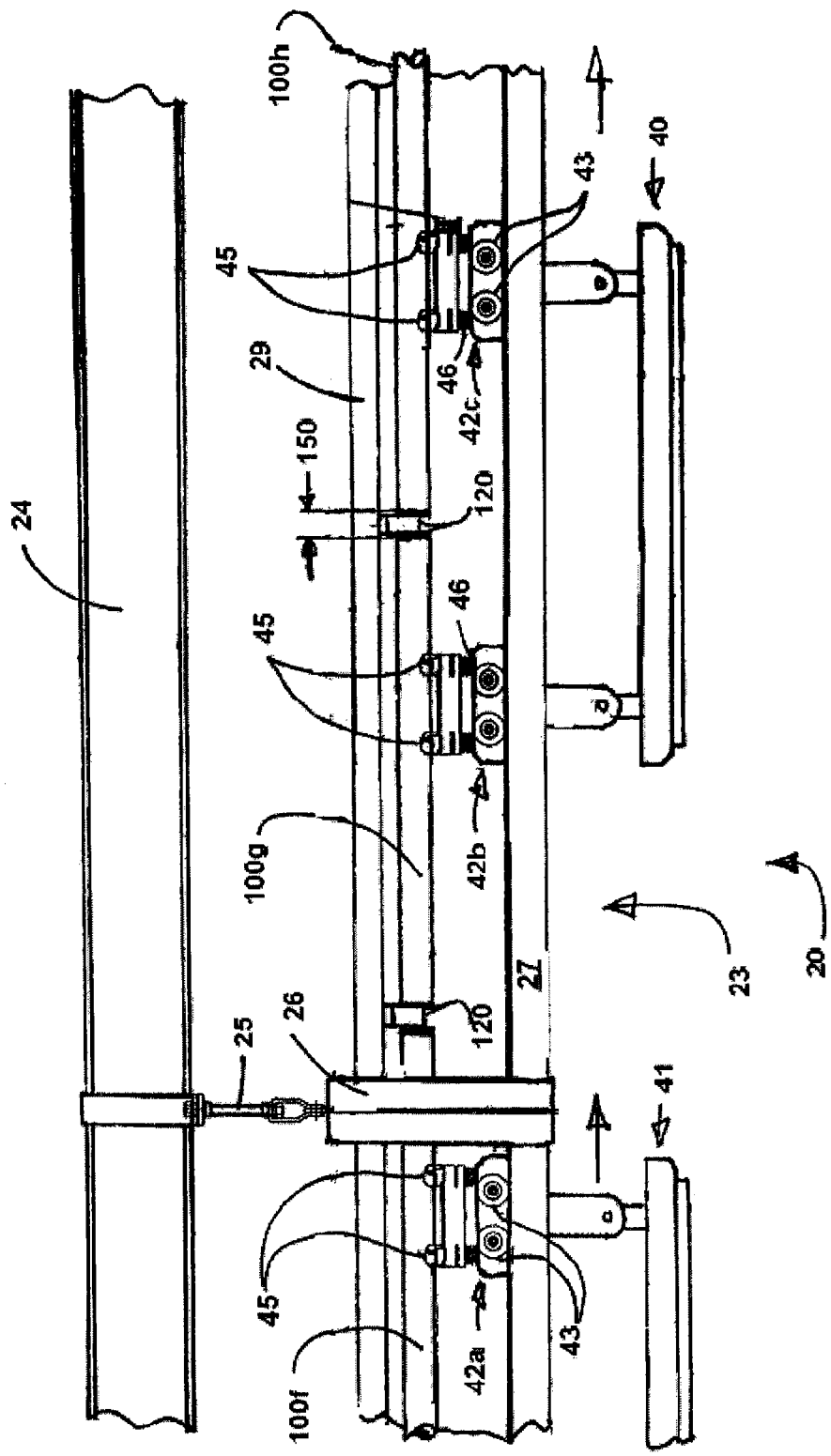
FIG. 2 shows a partial side view of another section of the overhead conveyor system of FIG. 1.

As shown in FIGS. 1 and 2, the overhead conveyor system 20 has one or more movable trolleys 40, 41 suspended therefrom to transport a load along a conveying path. The overhead conveyor system 20 has a rotating drive shaft 21 to propel the trolleys 40, 41 (FIG. 2), and a stationary frame or a support rail structure 23 to define the conveying path. The overhead conveyor system 20 may be hung from a support structure such as an I-Beam 24 to suspend the support rail structure 23 overhead with the trolleys 40, 41 hanging therebelow. A hanger 25 extends from the I-beam 24 to engage with a "C" shaped support frame 26 that supports the support rail structure 23. The support frame 26 is "C" shaped and is orientated with an opening in the "C" orientated downward for the passage of trolleys 40, 41, therethrough. In FIG. 2, a trolley 41 can be seen just before passing through the support frame 26. The rotating drive shaft 21 used to propel the trolleys 40, 41, can be configured as a plurality of drive shaft segments 100a, 100b, 100c, 100d, and 100e (see FIG. 1) with each drive shaft segment 100 having a shaft axis 101 extending along the conveying path. As shown, the drive shaft segments 100 can be placed end-to-end in a line along the conveying path and mounted to the support rail structure 23 with a plurality of pillow blocks 120. Pillow blocks 120 are shown between drive shaft segments 100a and 100b, and between drive shaft segments 100d and 100e in FIG. 1, and between drive shaft segments 100f and 100g, and 100g and 100h in FIG. 2. Pillow blocks 120 each contain a rotational bearing 121 (FIG. 3) to rotationally support an end of each of the two adjacent drive shaft segments 100, and each pillow block 120 spaces adjacent shaft segments apart with a gap 150. The support rail structure 23 further comprises at least one alignment member 29 attached at the top of the support rail structure 23 and configured to follow the conveying path. The at least one alignment member 29 is further configured to receive and align the pillow blocks 120 as they are mounted onto to the support rail structure 23.

One or more support rails 27 are attached at the bottom of the support frame 26 on either side of the "C" opening to guide and support the trolleys 40, 41 as they move along the conveying path. In this embodiment, the one or more support rails 27 comprise a pair of parallel support rails 27 with the trolleys 40, 41 hanging down therebetween. Carriages 42 are attached to each end of trolleys 40, 41, and have load wheels 43 that roll along a top of the parallel support rails 27. Carriages 42 support the weight of the loaded trolleys 40, 41 and are guided to roll along the parallel support rails 27. For this discussion, the carriages 42 are configured to have four load wheels 43 in a rectangular orientation with two load wheels 43 rolling on top of each of the parallel support rails 27. In some alternate embodiments, a trolley can hang from a single carriage (not shown) or one or more support wheels 43.

Figure 4:
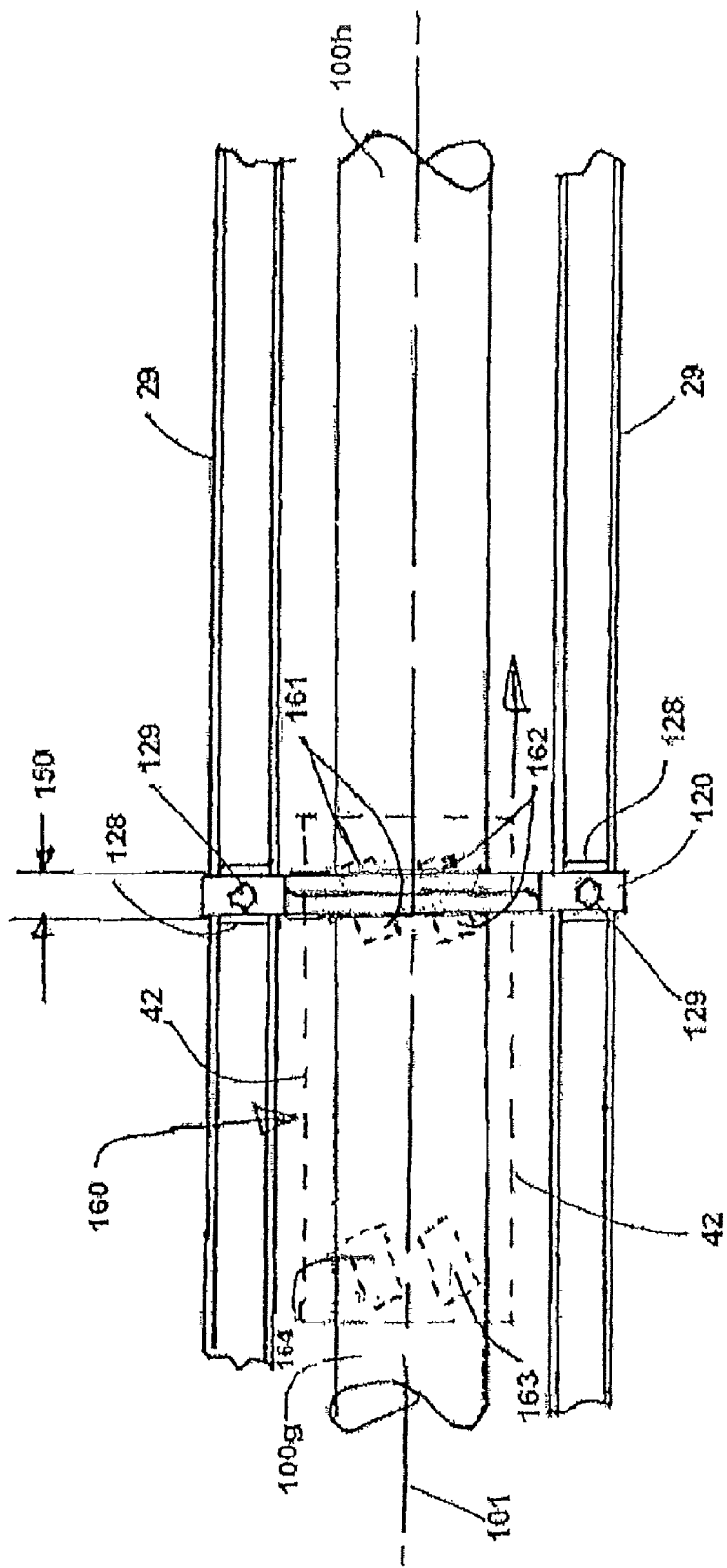
FIG. 4 is a partial bottom view of the rotating shaft drive system of FIG. 1 with one of two trolleys moved to a different position by the rotating shaft drive.

Turning now to FIG. 1, the trolleys 40, 41 are driven along the conveying path by the rotating drive shaft segments 100. Each carriage 42 has at least one canted driven roller 45 extending upwards from the carriage 42 to tractionally engage with a rotating outer surface 31 of the adjacent drive shaft segment 100. Each canted driven roller 45 can be constructed from an elastomeric material such as a rubber or a urethane, and is configured to rotate freely. As shown in FIG. 4, four canted driven rollers 45 are provided for this embodiment, and the rollers 45 contact the outer surface 31 in the canted orientations shown. Canted driven rollers 45 used in conjunction with a rotating shaft are well known in the art as a conveyor propulsion system, and a description of such can be found in U.S. Pat. No. 5,785,168 to Thomas Beall which is incorporated by reference herein in its entirety. The canted driven rollers 45 engage with one or more rotating drive shaft segments 100 with sufficient traction so as to form a helical loci of engagement with each of the driven rollers 45 to propel the carriage 42 along the conveying path. The contact of each of the canted driven rollers 45 with one or more drive shaft drive segments 100 describe a helical spiral contact path on the outer surface 31 of each of the contacted shaft drive segments 100. One or more springs 46 can be provided on the carriage 43 to bias the canted driven rollers 45 into contact with the rotating drive shaft segment 100 and a spring 46 can be seen in this view biasing the roller 45 upwards into contact with shaft segments 100a and 100b across gap 150.

The canted driven roller 45 has a roller diameter 47 and roller length 48 configured to bridge across the gap 150, and roller 45 is configured to always provide traction (propulsive force) to the carriage 42 when moving across the gap 150 from rotating drive shaft 100a to rotating drive shaft 100b. The configuration of the pillow block 120, the canted driven rollers 45, and the adjacent drive shaft segments 100a, 100b enable the carriage 42 to receive propulsive force from the driven rollers 45 as rollers 45 approach the gap 150, as they cross the gap 150, and as they move beyond the gap 150. The gap 150 can be between about 1.25 inches and about 0.5 inches. Gap 150 can also be between about 1 inch and about 0.75 inches in another embodiment, and in yet another embodiment can be about 0.88 inches. Thus, in FIG. 1, the drive roller 45 is shown bridging the gap 150 and is being propelled by contact with both of the shaft segments 100 and 100b to show how the drive system is configured to continuously provide carriage driving force across the gap 150.

A motor 140 is provided to power the rotating drive shaft segments 100. Motor 140 is shown attached to the support rail structure 23 and is configured to engage with the drive shaft segments 100 via a drive system 143 such as, but not limited to a chain drive. Alternate drive systems of the drive system can include belts, gear trains, couplers or any other method of transferring rotational motion and torsional power to a drive shaft 21. Motor 140 is connected to a gearbox 141 to change the speed of the motor output, and to rotate a pair of chain sprockets 142a, 142b. The chain sprockets 142a, 142b are connected to the shaft segments 100 by a pair of chains 144a and 144b that engage with a pair of shaft sprockets 145a, 145b attached to the shaft segments 100. Thus, rotational output from the motor 140 is transferred to the shaft segments 100 to propel the trolleys 40, 41.

FIG. 2 shows a partial side view of another section of the overhead conveyor system 20 with the rotating shaft segments 100f, 100g, and 100h provided to propel the trolleys 40, 41 along the conveying path. Support rail structure 23 is shown hung from an I-beam 24 and propelling trolleys 40, 41 to the right (see arrows). Carriages 42b and 42c are located at each end of trolley 40, and carriage 42a is located at a right end of partially shown trolley 41.

Figure 3:
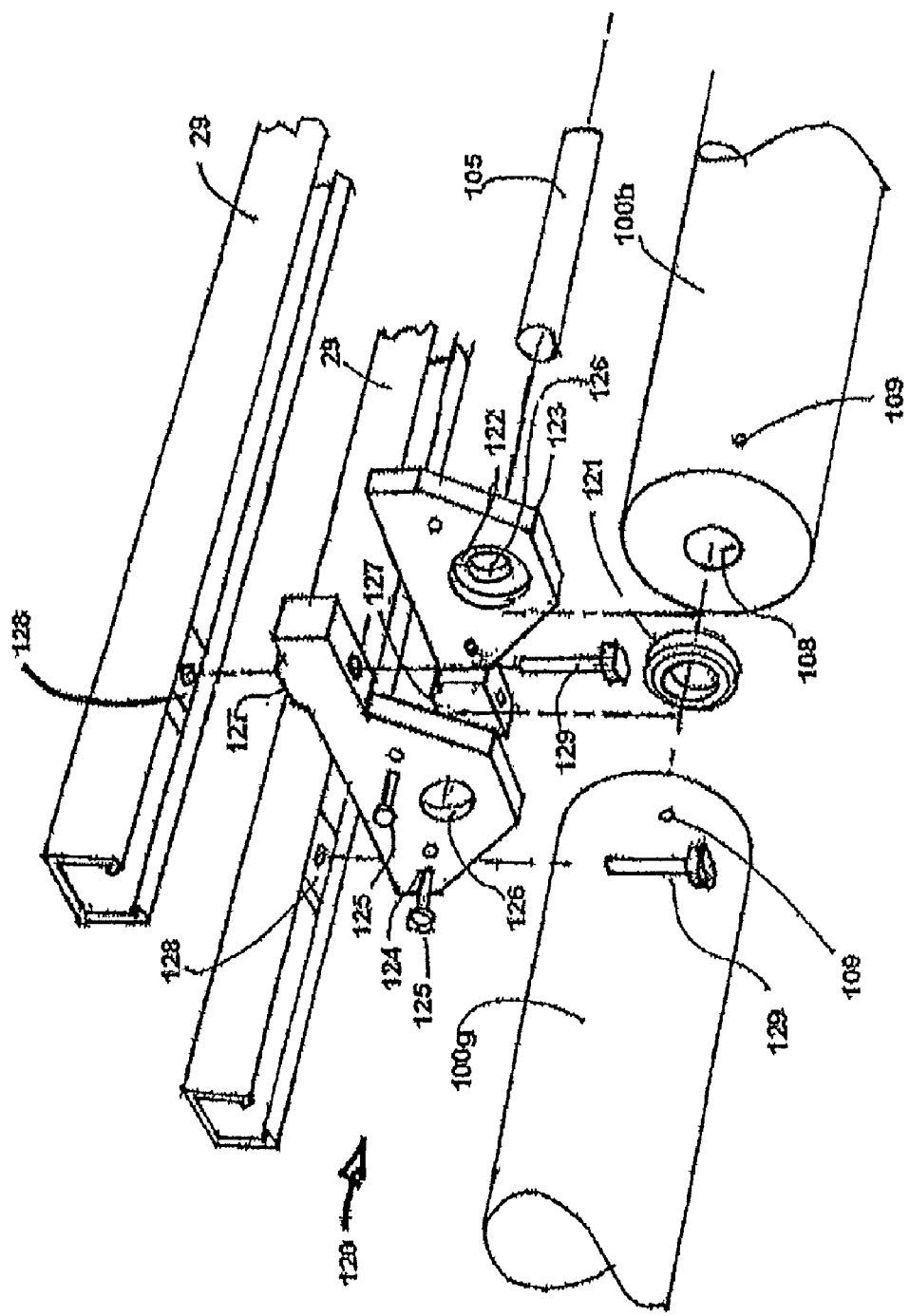
FIG. 3 is an exploded view of a pillow block of FIG. 1 with a pair of drive shaft segments for rotational connection thereto, and showing a short section of a pair of parallel alignment members that extend along the conveying path for the mounting of an assembled pillow block thereto.

FIG. 3 is an exploded view of the pillow block 120, the drive shaft segments 100g and 100h, and a short section of a pair of parallel alignment members 29 that extend along the conveying path. Parallel alignment members 29 attach to the support rail structure 23 and are configured to align the pillow blocks 120 to the conveying path to ensure free rotation of the driven shaft segments 100. The rotational bearing 121 is a standard ball bearing configured to receive a bridging shaft 105 within and configured to mount in opposing bores 122 within a first housing half 123 and a second housing half 124. As shown, first housing half 123 and a second housing half 124 are identical and mount together when oriented as shown. Identical housing halves 123, 124 efficiently reduce the number of different parts and reduce costs. Screws 125 or other fasteners can be used to secure first housing half 123 to second housing half 124 and to secure the bearing 121 therebetween. In an embodiment, the assembled first housing half 123 and a second housing half 124 have a width of 0.75 inches and the bearing 121 has a clearance spacer on either side to set both the width of the assembled pillow block 120 and the gap 150 to about 0.88 inches, and to housing halves 123, 124 are formed to align the non-aligning bearing 121 with respect to the housing. Bridging shaft 105 can be straight, splined or any other shape and is configured to extend through an opening 126 in the housing halves 123, 124 through the rotational bearing 121 and into the bores 108 in the ends of the shaft segments 100g and 100h. Bridging shaft 105 can be retained within a shaft bore 108 of the shaft segments 100g, 100h via a fastener 109 such as setscrew, pin, adhesive, or any other method of fastening. When bridging shaft 105 is splined, it can engage with splines in the shaft bore 108 (not shown) of the shaft segments 100g. A geometric alignment member 127 extends from an upper surface of the first housing half 123 and second housing half 124 and is configured to be received within the parallel alignment members 29 of the support rail structure 23. As shown, geometric alignment member 127 extends upwardly from each of the housing halves 123, 124 and has a pair of angled surfaces that are configured for alignment in the parallel alignment members 29. Since bearing 121 is non-aligning, the alignment of the bearings 121 to the support rail structure 23 and to the drive shaft segments 100 is accomplished by aligning the bearing 121 between housing haves 123, 124, and then aligning the assembled pillow block 120 to the parallel alignment members 29 via alignment of the geometric alignment member 127 in the "U" of the alignment members 29. Pillow blocks 120 mount to the alignment members 29 with bolts 129 that engage with a mounting block 128 within the alignment members 29.

FIG. 4 is a view looking up at a pillow block 120 attached to the alignment members 29 with bolts 129. Mounting blocks 128 can be seen adjacent to bolts 129 and below the pillow block 120. Shaft drive segments 100g, 100h are engaged with the pillow block 120 with a gap 150 therebetween and are rotating. A carriage 42 is shown in outline view with a pair of leading driven rollers 45 bridging across the gap 150 and a pair of trailing rollers 45 shown to the left thereof. The canted driven rollers 45 and carriage 43 are removed for clarity to show a contact patch area 160 where each of the canted driven rollers 45 contacts or touches on one or more of the shaft drive segments 100g, 100h. These contact patches 160 are shown as dashed lines of about rectangular shape and are canted relative to the shafts 100g, 100h. A first contact patch 161 and a second contact patch 162 comprise the leading contact patches, and a third contact patch 163 and a fourth contact patch 164 comprise the trailing contact patches. Leading contact patches 161, 162 bridge across the gap 150, and show partial driving contact with shaft drive segments 100g, and 100h. Note how driving force is always transmitted through the contact patches 161, 162 when moving across the gap 150. An arrow is provided to show the direction of motion of the carriage 42.

It should be appreciated that any patent, publication, or other disclosure material, in whole or in part, that is the to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is the to be incorporated by reference herein, but which conflicts with existing definitions, statements, or other disclosure material set forth herein will only be incorporated to the extent that no conflict arises between that incorporated material and the existing disclosure material.

While the present the drive system has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

What is claimed is:

1. A method of propelling at least one load across a gap in a rotating drive shaft of an overhead conveyor system, the method comprising:

a) providing a first shaft segment and a second shaft segment coaxially aligned along a common shaft axis with a gap therebetween, and a carriage with at least one driven wheel in contact with an outer drive surface of at least one of the shaft segments, the at least one driven wheel canted at an angle to the co-axis of the rotating first shaft segment and the rotating second shaft segment, further providing a bearing housing positioned within the gap between the first shaft segment and the second shaft segment, wherein the bearing housing comprises a first portion, wherein the first portion comprises a first bore, a second portion, wherein the second portion comprises a second bore, and a bearing, wherein the bearing is positioned within the first bore and the second bore and secured therein when the first portion and the second portion of the bearing housing are assembled together, wherein when the first portion and the second portion of the bearing housing are assembled together the first portion and the second portion are divided along a plane that is substantially perpendicular to the common shaft axis of the first shaft segment and the second shaft segment;

b) rotating the first shaft segment and the second shaft segment simultaneously to tractionally engage the at least one driven wheel with the rotating outer drive surface of at least one of the first shaft segment and the second shaft segment so as to form a constant helical loci of engagement with sufficient force to propel the carriage with the at least one driven wheel, wherein the at least one driven wheel is always in driven contact with at least one of the rotating first and second shaft segments to continuously provide propulsion to the carriage.

2. The method of claim 1 wherein when the at least one driven wheel is at least partially in contact with the first shaft segment and at least partially over the gap, the carriage is propelled by contact between the at least one driven wheel and the first shaft segment.

3. The method of claim 1 wherein when the at least one driven wheel is at least partially in contact with the first shaft segment and at least partially in contact with the second shaft segment and at least partially over the gap, the carriage is propelled by contact between the at least one driven wheel and both the first shaft segment and the second shaft segment.

4. The method of claim 1 wherein when the at least one driven wheel is at least partially over the gap and at least partially in contact with the second shaft segment, the carriage is propelled by contact between the at least one driven wheel and the second shaft segment.

5. The method of claim 1 wherein the first portion of the bearing housing and the second portion of the bearing housing are substantially identically sized and shaped.

6. The method of claim 1 wherein the gap comprises a width, wherein the width of the gap is between about 1.25 inches and about 0.5 inches.

7. The method of claim 1 wherein the gap comprises a width, wherein the width of the gap is between about 1 inch and about 0.75 inches.

8. The method of claim 1 wherein the gap comprises a width, wherein the width of the gap is about 0.88 inches.

9. The method of claim 1 wherein the contact of the at least one driven wheel with the outer drive surface of at least one of the shaft segments creates a canted contact patch between the driven wheel and the outer drive surface.

10. A rotating shaft drive system for propelling at least one load along a conveying path of an overhead conveyor system, comprising:
a stationary frame extending along the conveying path;
a plurality of rotating drive shafts oriented end-to-end along the conveying path with each of the plurality of drive shafts rotating about a shaft axis parallel to the conveying path and each having a gap between adjacent drive shafts;
a pillow block located within the gap between adjacent drive shafts to mount the plurality of rotating drive shafts to the stationary frame, wherein the pillow block further comprises an integral geometric alignment member, wherein the geometric alignment member extends from an upper surface of the pillow block;
a first alignment member attached to the stationary frame, wherein the first alignment member comprises an elongated member configured to receive the integral geometric alignment member of the pillow block thereby aligning the pillow block with the conveying path;
a carriage configured to carry a load along the conveying path;
at least one driven wheel mounted on the carriage and free to rotate thereto, the at least one driven wheel canted at an angle to the shaft axis of the drive shaft and configured to tractionally engage with an outer drive surface of at least one of the plurality of rotating drive shafts with sufficient traction so as to form a helical loci of engagement with sufficient force to propel the carriage along the conveying path;
wherein the at least one driven wheel is always in driven contact with at least one of the plurality of rotating drive shafts to continuously provide propulsion to the carriage as said at least one driven wheel transitions from a first one of a plurality of rotating drive shafts to a second one of the plurality of drive shafts across the gap.

11. A rotating shaft drive system for propelling at least one load along a conveying path of an overhead conveyor system, comprising:
a stationary frame extending along the conveying path;
a plurality of rotating drive shafts oriented end-to-end along the conveying path with each of the plurality of drive shafts rotating about a shaft axis parallel to the conveying path and each having a gap between adjacent drive shafts;
a pillow block located within the gap between adjacent drive shafts to mount the plurality of rotating drive shafts to the stationary frame, wherein the pillow block comprises a first housing half and a second housing half, wherein the first housing half comprises a first geometric alignment member, wherein the second housing half comprises a second geometric alignment member;
a first alignment member attached to the stationary frame, wherein the first alignment member comprises an elongated member configured to receive a first portion of the pillow block thereby aligning the pillow block with the conveying path, wherein the first geometric alignment member comprises the first portion of the pillow block received by the first alignment member;
a second alignment member attached to the stationary frame, wherein the second alignment member comprises an elongated member configured to receive a second portion of the pillow block thereby aligning the pillow block with the conveying path, wherein the second alignment member is arranged parallel to the first alignment member, wherein the second geometric alignment member comprises the second portion received by the second alignment member;
a carriage configured to carry a load along the conveying path;
at least one driven wheel mounted on the carriage and free to rotate thereto, the at least one driven wheel canted at an angle to the shaft axis of the drive shaft and configured to tractionally engage with an outer drive surface of at least one of the plurality of rotating drive shafts with sufficient traction so as to form a helical loci of engagement with sufficient force to propel the carriage along the conveying path;
wherein the at least one driven wheel is always in driven contact with at least one of the plurality of rotating drive shafts to continuously provide propulsion to the carriage as said at least one driven wheel transitions from a first one of a plurality of rotating drive shafts to a second one of the plurality of drive shafts across the gap.

* * * * *